E. GUNDLACH.
Object-Glasses for Microscopes.
No. 198,914. Patented Jan. 1, 1878.
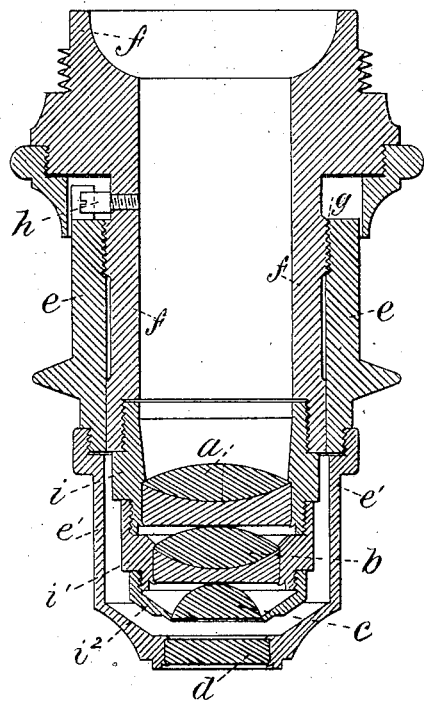
WITNESSES.
W Grady
Joseph R. Sudlam
Ernst Gundlach
INVENTOR.

UNITED STATES PATENT OFFICE.

ERNST GUNDLACH, OF ROCHESTER, NEW YORK, ASSIGNOR OF ONE-HALF HIS RIGHT TO JOHN J. BAUSCH, OF SAME PLACE, AND HENRY LOMB, OF BROOKLYN, N. Y.

IMPROVEMENT IN OBJECT-GLASSES FOR MICROSCOPES.

Specification forming part of Letters Patent No. 198,914, dated January 1, 1878; application filed November 28, 1877.

*To all whom it may concern:*

Be it known that I, ERNST GUNDLACH, of Rochester, Monroe county, New York, have invented certain new and useful Improvements in the Construction of Object-Glasses for Microscopes, of which the following is a correct and exact specification and description, reference being had to the accompanying drawing, (representing a section of an object-glass constructed according to my new and improved method,) and to the letters marked on the same.

My invention consists of a new method for adjusting object-glasses for microscopes to the varying thicknesses of the glass covers of object-slides, by means of which such adjustment can be more effectually made than by the methods hitherto employed for that purpose.

The performance of object-glasses for microscopes, constructed on the plan hitherto adopted, can be perfect only for covers of one thickness, while for covers of all other degrees of thickness the performance is deteriorated, and this obtains to an extent which is the greater the more the cover deviates from the proper thickness. This holds true even when the object-glass has been adjusted by the ordinary and well-known means to the special thickness of cover that is being used.

If, for instance, an objective develops its highest possible capacity of performance with a cover having a thickness of one two-hundredths of an inch, it will then, as every experienced microscopist knows, suffer a considerable reduction in its efficiency when a cover-glass of one one-hundreth of an inch is used. And this is true even when the objective, as constructed after the best methods now in use, has been adjusted for this latter thickness (one one-hundredth of an inch) as perfectly as is possible.

What is true of covering-glasses thicker than one two-hundredths of an inch is also true of those which are thinner, and also with objects which are uncovered. This deterioration or lessening of efficiency arises from a chromatic over-correction where the cover-glasses are too thin, and a corresponding under-correction where they are too thick, and is due to the method of adjustment now in use by our best makers, and which consists in changing the relative distances of the lenses composing the system.

In order to obviate the defect which I have just described, I construct my new and improved objective in the following manner: The lenses *a*, *b*, and *c*, of the system are fastened immovably at proper distances. *d* is a glass disk, with two parallel plane surfaces, and is fastened in the setting *e'*, which setting is screwed onto the ring *e*. The ring *e*, together with the setting *e'* of the glass disk *d* connected with it, incloses the setting *f* of the actual objective with the lenses *a b c* composing the system. It is adjustable by a screw, *g*, placed on the upper and outer surface of the setting *f* of the objective in such a way that, by means of this screw, the plane glass *d* can be either approached, and even brought into contact with, the front lens *c* of the objective, or be moved away from the same.

When the lens *c* and the parallel plane-glass disk *d* are in actual contact, the objective is adjusted for the greatest thickness of covering-glass admissible for that objective, and the combined thickness of both the glasses *c* and *d* corresponds to the thickness which the lens *c* alone ought to have had, so that it, in combination with the other lenses of the system, might give the best possible image, provided the glass disk *d* had been omitted.

With the application of thinner covering-glasses, however, a corresponding increase becomes necessary in order to retain the greatest possible degree of efficiency. This required thickening is effected by placing between the plane-glass disk *d* and the front lens *c* an appropriate fluid of as high a refracting power as possible—for instance, glycerine.

It will be readily seen that, by means of the adjustment effected by the screw *g*, and the consequent approach or separation of the disk *d* from the front lens *c* of the objective, this fluid layer will be made correspondingly thicker or thinner, while the adhesion of the fluid particles to the respective glass surfaces and their cohesion among themselves prevent a disruption of the connection.

The corresponding thickening of the front lens in the above-described manner, by means of a layer of an appropriate fluid placed between the front lens $c$ of the objective and the plane-glass disk $d$, affording a direct compensation for the diminution of the covering-glass thickness, it is clear that, with correct adjustment, the corrections of the aberrations of the objective, and consequently its performance, remain unaltered.

Furthermore, as the distances between the separate lenses composing the system remain the same, undisturbed by this plan of adjustment, the magnifying power also remains undisturbed and unaltered, and the working distance is the same when the object is uncovered as it is when the thickest covering-glass admissible for the objective is employed.

What I claim as new, and desire to have secured to me by Letters Patent, is—

The combination of the adjustable transparent plate $d$ with the front lens $c$ of the objective, the two being connected by a highly-refractive liquid, and the whole operating in the manner and for the purpose substantially as described.

ERNST GUNDLACH.

Witnesses:
WM. GRAEBE,
JOSEPH R. LUDLAM.